United States Patent [19]

DeMars

[11] Patent Number: 4,911,881
[45] Date of Patent: Mar. 27, 1990

[54] SPRING PACKED PARTICLE BED FUEL ELEMENT

[75] Inventor: Richard V. DeMars, Lynchburg, Va.

[73] Assignee: The Babcock & Wilcox Company, New Orleans, La.

[21] Appl. No.: 211,741

[22] Filed: Jun. 27, 1988

[51] Int. Cl.$^4$ ................................................ G21C 3/30
[52] U.S. Cl. ..................................... 376/430; 376/381
[58] Field of Search ............... 376/430, 431, 420, 380, 376/381, 382

[56] References Cited

U.S. PATENT DOCUMENTS

| | | | |
|---|---|---|---|
| 3,406,090 | 10/1968 | Dunn | 376/430 |
| 3,671,393 | 6/1972 | Williams | 376/430 |
| 3,679,545 | 7/1972 | Leirvike | 376/430 |
| 4,699,757 | 10/1987 | Cloue | 376/412 |

*Primary Examiner*—Donald P. Walsh
*Attorney, Agent, or Firm*—Robert J. Edwards; D. Neil LaHaye

[57] ABSTRACT

A particle bed fuel element designed to accommodate expansion and contraction within the particle fuel bed. Porous inner and outer frits connected together by an end cap at a first end and radially guided by a shoulder at a second end receive fuel particles in the annulus formed therebetween. Compressive devices at each end of the frits and within the fuel bed maintain packing force to prevent looseness during contraction and allow expansion without excessive pressure being placed on the fuel particles. Pairs of beleville springs, wave springs, and pressurized thin-walled metal donuts may be used as the compressive devices.

7 Claims, 2 Drawing Sheets

SPRING PACKED PARTICLE BED FUEL ELEMENT

BACKGROUND OF THE INVENTION

1. Field of the Invention

The present invention is generally related to nuclear fuel elements and in particular to particle bed fuel elements.

2. General Background

Particle Bed Reactors (PBR's) first conceived in the early sixties were intended to be an improvement over the solid core reactors developed in conjunction with rocket propulsion programs. The PBR's then proposed consisted generally of an annular bed of nuclear fuel particles held on the outside by a porous tube (outer frit). In some concepts the particle bed was held against the outer frit by centrifugal force by rotating the bed and frit. This was referred to as the rotating bed. In another concept referred to as the fixed bed the particles were held between an inner and outer frit. In both concepts coolant gas entered through the outer frit, flowed radially inward through the fuel particle bed where it was heated, and exhausted axially along the central void in the bed. Another variation of the particle bed reactor involved an array of discrete fuel elements consisting of an outer and inner frit, a bed of fuel particles and suitable end fittings to hold the assembly together. These fuel elements typically have a length to outside diameter ratio of four to one or larger whereas the initial rotating bed and fixed bed concepts generally had a ratio of about one to one. During operation nuclear fuel elements present problems associated with growth of fuel particles during burnup and differential thermal expension and contraction of the particle bed and inner and outer frits. During changes in component temperatures differential thermal expansions or contractions may cause the fuel particle bed to undergo increased compression or, conversely, compressive loads may be removed, causing the bed to become loose. Excessive compressive loads could cause the fuel particles to fail by fracturing or the confining frits to distort. A loose bed may allow coolant gas to flow more freely through some areas than others, resulting in undesirable cold and hot spots within the fuel particle bed. A properly designed particle bed reactor fuel element must be able to accommodate specified changes in temperature and resulting differential expansions.

One known approach to the above problem has been to provide a wave spring positioned at each end of the fuel bed.

Patents known to the applicant which tend to address the differential expansion/contraction problem include the following.

U.S. Pat. No. 3,679,545 to Leirvik discloses a nuclear reactor core element utilizing one or more corrugated tubular spacer members that resiliently support and locate within a sealed cladding tube either nuclear fuel material or neutron absorber material. Each corrugated spacer is located in a plenum zone within the cladding tube and radially reinforces the tube wall section around such plenum zone against collapse by external fluid pressure.

U.S. Pat. No. 3,989,590 to Wehrli, III et al. discloses an internally pressurized hermetically clad fuel element for a nuclear reactor having a sealed collapsible capsule within the fuel element plenum. The capsule is controllably collapsed in a buckling mode with increases in plenum pressure to maintain the fuel element pressure substantially constant throughout its operating life.

U.S. Pat. No. 3,647,623 to Hepps et al. discloses a metallic clad fuel element for nuclear reactors which has a bellows-like member internally supported therein and communicably coupled with the environment of the fuel element so as to maintain an internal pressure substantially equal to the external or environmental pressure during burnup.

U.S. Pat. No. 3,677,894 to Ferrari discloses a fuel element for a pressurized nuclear reactor comprising a sealed cladding case, nuclear fuel therein and means for producing an internally pressurized atmosphere so that the fuel element is free standing, and characterized by metal wall cladding having a reduced thickness for conditions of reactor use.

U.S. Pat. Nos. 3,009,869 to Bassett, 3,772,147 to Bratton et al., 3,274,067 to Greebler et al., 3,291,698 to Fortescue, 3,671,393 to Williams, 4,011,134 to Stehle et al., 4,699,757 to Cloue, and 4,111,748 to Hayashi et al. are directed toward a variety of spacer members representative of the known state of the art.

The patents are all directed toward sealed fuel elements having plenum chambers to trap and retain fission gases produced by the fuel therein during burnup while also providing for some longitudinal expansion of fuel segments. This is different from the problem addressed by the present invention, differential expansion and contraction of porous, not sealed, fuel elements and fuel particles wherein the cooling gas flows directly through a bed of fuel particles, not large fuel segments, in direct contact with the fuel particles. The only approach to this problem as mentioned above is considered insufficient because of its limitation on the length-to-width ratio of the fuel element. A solution to the problem is needed wherein expansion and contraction may occur without causing damage to or looseness of the fuel particles, a significant amount of fuel is not displaced, a significant amount of neutron absorbing material is not added, and there is no significant interference with the proper distribution of coolant gas flow.

SUMMARY OF THE INVENTION

The present invention addresses the above problem in a straightforward manner. What is provided is a particle bed fuel element having compression devices strategically located within the particle bed. Porous inner and outer frits are connected to each other at one end by a cap. At the other end a shoulder between the two frits positions them radially but does not restrain them axially. A spring and washer may be placed at one end or both ends to maintain a packing force on the fuel particle bed. One or more compression devices are incorporated within the fuel particle bed between the ends of the inner and outer frits. The compression devices are located next to the outer frit and sized to occupy approximately one-half of the bed thickness between the two frits.

BRIEF DESCRIPTION OF THE DRAWINGS

For a further understanding of the nature and objects of the present invention reference should be had to the following description, taken in conjunction with the accompanying drawings, in which like parts are given like reference numerals and, wherein.

DETAILED DESCRIPTION OF THE PREFERRED EMBODIMENT

Figure 1:
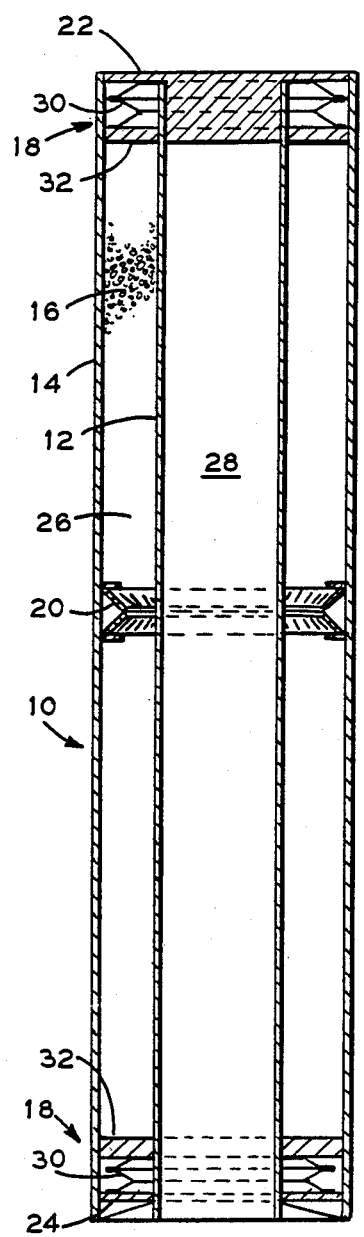
FIG. 1 is a cutaway view of the invention illustrating the compression devices in the expanded condition.
Figure 2:
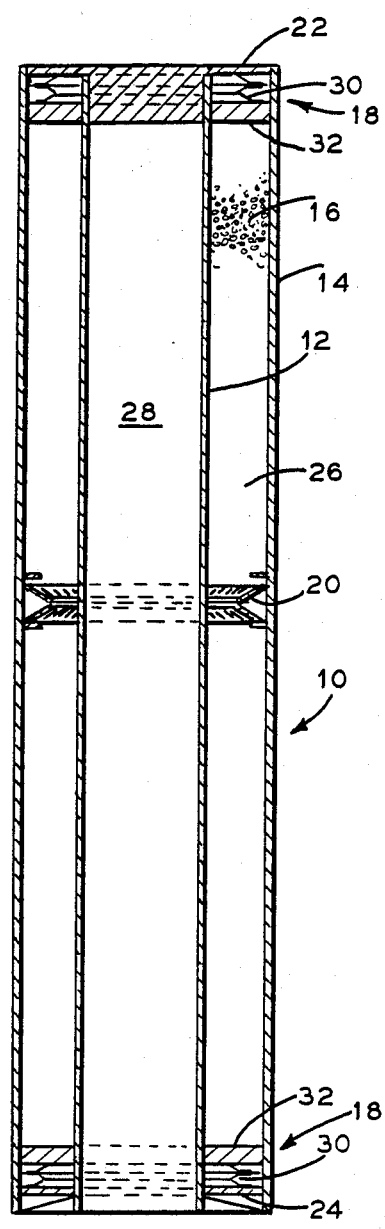
FIG. 2 is a cutaway view of the invention illustrating the compression devices in the compressed condition.

Referring to the drawings, it can be seen in FIG. 1 that the invention is generally referred to by the numeral 10. Particle bed fuel element 10 is generally comprised of inner frit 12, outer frit 14, fuel particle bed 16, first compressive devices 18, and second compressive device 20.

Inner and outer frits 12, 14 may be formed from any material in the art known to be suitable for nuclear reactor conditions. Frits 12, 14 are porous to allow the flow of coolant gas through the frits and across fuel particle bed 16. Inner frit 12 is smaller in diameter than outer frit 14. Frits 12, 14 are connected to each other at a first end by end cap 22 which retains the frits in their axial and radial positions relative to each other. At a second end frits 12, 14 are positioned radially by shoulder 24 but are unrestrained axially. This forms an annulus 26 between the two frits which holds fuel particle bed 16.

Fuel particle bed 16 is comprised of a plurality of fuel particles suitably sized for heat transfer to coolant gas directed through annulus 26 and particle bed 16. In normal operation coolant gas is directed radially through particle bed 16 into interior bore 28 of inner frit 12 and then axially out one end of bore 28. End cap 22 prevents flow out the other end. The fuel particles are relatively small in comparison to fuel segments used in sealed fuel elements and are maintained in a properly packed condition by compressive devices.

First compressive devices 18 may be positioned at one or both ends of annulus 26 in particle bed fuel element 10. In the preferred embodiment compressive devices 18 are provided at both ends as this allows a larger length to width ratio for fuel element 10. First compressive device 18 is formed from a spring 30 and washer 32 adjacent either end of fuel element 10. Spring 30 is illustrated as a wave spring but may be of another suitable type. At the first end spring 30 bears against end cap 22 and at the second end against shoulder 24. Washer 32 is slidably positioned between inner frit 12 and outer frit 14 against spring 30. In this manner a packing force is maintained on fuel particle bed 16 which allows expansion and contraction within fuel particle bed 16 without undue stress or looseness among the fuel particles. Many particle bed reactor applications require fuel element designs to have a high ratio of bed length to effective bed diameter. This results in friction forces in the central axial portion of the fuel bed which can not be overcome, causing friction lock up of fuel particles and excessive compression loads.

Figure 3:
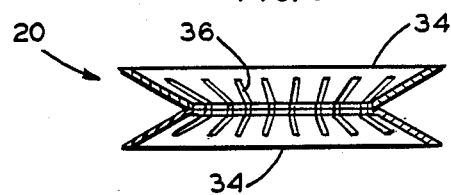
FIG. 3 is an enlarged side view of the compression device.

Second compressive device 20 positioned in annulus 26 within fuel particle bed 16 accommodates such local expansion. Although only one second compressive device 20 is shown for ease of illustration more than one may be used. FIG. 3 provides an enlarged view of second compressive device 20. In the preferred embodiment second compressive device 20 is comprised of two slotted belleville washers or springs 34 with the smaller circumference ends positioned adjacent each other. This results in the formation of a v-shape which opens in the outward direction with respect to inner and outer frits 12, 14. The outer diameter of belleville spring 34 is sized to conform with outer frit 14 only with sufficient clearance to allow desired spring motion. Springs 34 are provided with slots 36 to allow coolant gas to flow through the spring and cool it before entering fuel particle bed 16 on either side of springs 34. Slots 36 also serve to increase the elastic compressibility of springs 34. It should be noted that slots 36 must be narrower than the fuel particles to prevent them from entering the void space between springs 34 and preventing full compression. When fully compressed, springs 34 are flat and only occupy a volume in particle bed 16 equivalent to their material volume. The open end of the V is positioned next to outer frit 14 and sized to occupy only about one half of the thickness of fuel particle bed 16 when in the fully expanded position. By occupying mainly the outer region of fuel particle bed 16, the temperature of second compression device 20 can be maintained at a low enough temperature which allows it to be fabricated from any of several common spring materials. For a given axial height second compressive device 20 can accommodate a larger bed volume change when the V is located next to outer frit 14 that when located next to inner frit 12. Also, by not occupying the inner region of fuel particle bed 16, inner frit 12, the hotter of the frits, is allowed more unrestricted movement from second compression device 20.

Figure 4:
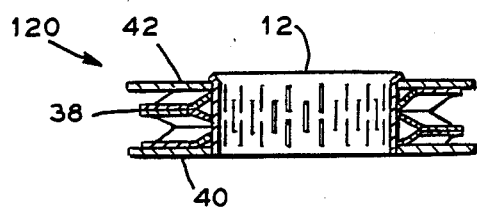
FIG. 4 is an enlarged side view of an alternate embodiment of the compression device.

FIG. 4 illustrates an alternate embodiment 120 of second compressive device 20 comprising a multilayer wave spring 38, spring enclosure 40, and flat washer 42 slidably engaged around spring enclosure 40. Spring enclosure 40 is provided with a perforated vertical section which engages inner frit 12 and an outwardly curved upper lip which prevents washer 42 from being forced off enclosure 40. The configuration of wave spring 38 and slots in spring enclosure 40 allow the desired flow of coolant gas to cool the spring pack before entering the fuel bed. The configuration of wave spring 38 also provides multiple point and uniformly applied loads to flat washer 42 which prevents cocking and, in turn, locking onto spring enclosure 40. This configuration of compressive device 120 can accommodate a large change in volume of fuel particle bed 16.

Figure 5:
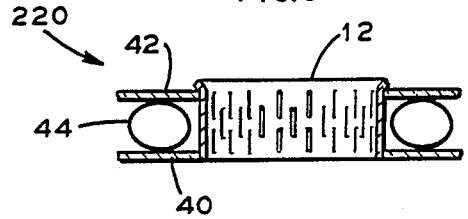
FIG. 5 is an enlarged side view of another alternate embodiment of the compression device.

FIG. 5 illustrates a second alternate embodiment 220 of second compressive device 20. Compressive device 220 utilizes spring enclosure 40 and flat washer 42 as described above. A pressurized thin-walled, hollow metal donut 44 is placed between enclosure 40 and washer 42 to act as the spring. This design is suited for conditions where creep of the spring material would normally cause loss of spring restoring force. Compressed gas inside metal donut 44 provides the restoring force.

In operation, compressive devices 18, 20 allow expansion and contraction within fuel particle bed 16 and inner and outer frits 12, 14 without undue pressure or looseness occurring in fuel particle bed 16. In the preferred embodiment optimum performance is obtained by using high strength spring materials such as high strength alloys of stainless steel, nickel, and beryllium copper to form compressive devices 18, 20.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A gas cooled particle bed nuclear fuel element, comprising:
   a. a porous inner frit;
   b. a porous outer frit attached to said inner frit by an end cap at a first end and radially guided by a shoulder at a second end, forming an annulus between said frits;
   c. a fuel particle bed in said annulus;
   d. a first compressive device at each end of said annulus; and
   e. a second compressive device positioned in said annulus within said fuel particle bed.

2. The fuel element of claim 1, wherein said first compressive device comprises a spring and washer slidably mounted in said annulus.

3. The fuel element of claim 1, wherein said second compressive device comprises two slotted belleville springs positioned adjacent each other.

4. The fuel element of claim 1, wherein said second compressive device comprises:
   a. a slotted spring enclosure positioned in said annulus;
   b. a wave spring mounted on said spring enclosure; and
   c. a washer slidably mounted on said spring enclosure adjacent said wave spring.

5. The fuel element of claim 1, wherein said second compressive device comprises:
   a. a spring enclosure positioned in said annulus;
   b. a pressurized metal donut mounted on said spring enclosure; and
   c. a washer slidably mounted on said spring enclosure adjacent said metal donut.

6. A gas cooled particle bed nuclear fuel element, comprising:
   a. a porous inner frit;
   b. a porous outer frit attached to said inner frit by an end cap at a first end and radially guided by a shoulder at a second end, forming an annulus between said frits;
   c. a fuel particle bed in said annulus;
   d. a first compressive device comprising a spring and washer slidably mounted at each end of said annulus; and
   e. a slotted second compressive device positioned in said annulus within said fuel particle bed whereby, when in the fully expanded position, said device occupies approximately one half of the thickness of said fuel particle bed adjacent said outer frit.

7. The fuel element of claim 6, wherein said second compressive device comprises two belleville springs positioned adjacent each other with the smaller circumference ends positioned adjacent each other and adjacent said inner frit.

* * * * *